United States Patent
Cui et al.

(10) Patent No.: US 12,035,191 B2
(45) Date of Patent: Jul. 9, 2024

(54) APPARATUSES AND METHODS FOR FACILITATING COMMUNICATION SERVICES VIA CONNECTIONLESS TECHNOLOGY

(71) Applicant: AT&T Intellectual Property I, L.P., Atlanta, GA (US)

(72) Inventors: Zhi Cui, Sugar Hill, GA (US); Hongyan Lei, Plano, TX (US); John Bartell, Milton, GA (US); Paul Edward Smith, Jr., Heath, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 46 days.

(21) Appl. No.: 17/670,556

(22) Filed: Feb. 14, 2022

(65) Prior Publication Data
US 2023/0262552 A1    Aug. 17, 2023

(51) Int. Cl.
*H04W 36/02*    (2009.01)
*H04W 36/00*    (2009.01)

(52) U.S. Cl.
CPC ..... *H04W 36/023* (2013.01); *H04W 36/0016* (2013.01); *H04W 36/0058* (2018.08); *H04W 36/0085* (2018.08)

(58) Field of Classification Search
CPC ........... H04W 36/023; H04W 36/0016; H04W 36/0085; H04W 36/0055; H04W 36/0058; H04W 36/24; H04W 36/00837; H04W 36/38
See application file for complete search history.

(56) References Cited

U.S. PATENT DOCUMENTS

| | | | |
|---|---|---|---|
| 8,280,375 B2 * | 10/2012 | Du | H04W 36/18 455/436 |
| 10,542,475 B1 * | 1/2020 | Singh | H04W 76/28 |
| 2003/0069018 A1 * | 4/2003 | Matta | H04L 43/0852 455/67.11 |
| 2012/0149375 A1 * | 6/2012 | Takubo | H04W 36/0085 455/436 |
| 2016/0007261 A1 * | 1/2016 | Oh | H04B 7/088 455/438 |
| 2016/0360462 A1 * | 12/2016 | Chockalingam | H04W 36/30 |

(Continued)

*Primary Examiner* — Kan Yuen
(74) *Attorney, Agent, or Firm* — GUNTIN & GUST, PLC; Dana B. LeMoine

(57) ABSTRACT

Aspects of the disclosure include transmitting first payload data to a first communication device via a first link, subsequent to the transmitting of the first payload data, obtaining a first indication that a handover is being negotiated between the first communication device and a second communication device, based on the first indication, placing, at a processing system, the first link in an inactive state, based on the first indication, storing second payload data in a buffer, and responsive to obtaining a second indication that the second communication device has accepted the handover: activating, at the processing system, a second link between the processing system and the second communication device, obtaining the second payload data from the buffer, and transmitting, based on the activating of the second link, the second payload data obtained from the buffer to the second communication device via the second link. Other aspects are disclosed.

20 Claims, 7 Drawing Sheets

(56) References Cited

U.S. PATENT DOCUMENTS

| | | | |
|---|---|---|---|
| 2017/0201306 A1* | 7/2017 | Shimezawa | H04W 72/0446 |
| 2018/0176834 A1* | 6/2018 | Wei | H04W 36/0066 |
| 2021/0185747 A1* | 6/2021 | Kanamarlapudi | H04W 76/15 |
| 2022/0345955 A1* | 10/2022 | Lin | H04W 36/0011 |

* cited by examiner

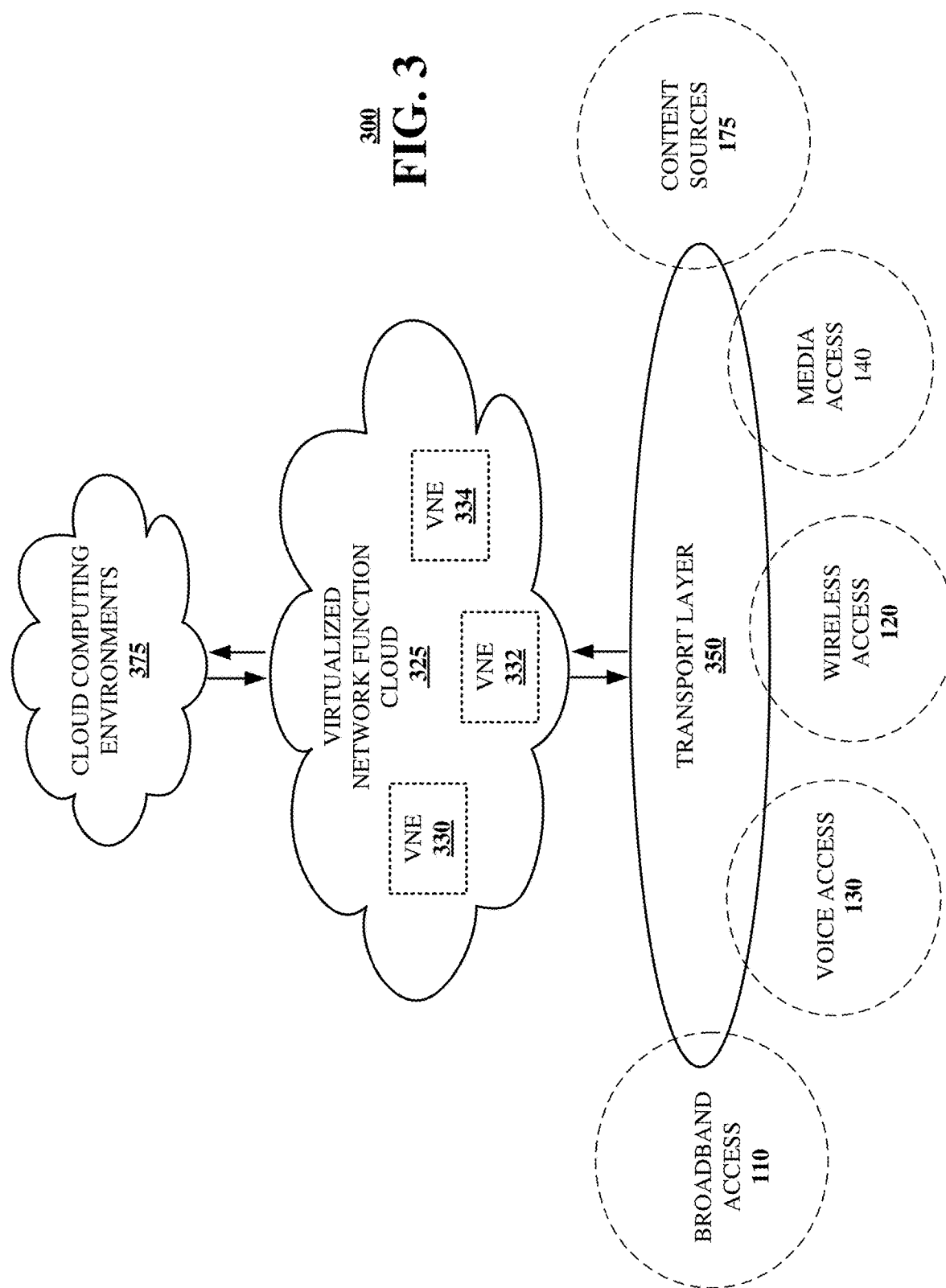

APPARATUSES AND METHODS FOR FACILITATING COMMUNICATION SERVICES VIA CONNECTIONLESS TECHNOLOGY

FIELD OF THE DISCLOSURE

The subject disclosure relates to apparatuses and methods for facilitating communication services via connectionless technology.

BACKGROUND

As the world increasingly becomes connected via vast communication networks and via various communication devices (including, for example, extended/cross reality devices, smart devices, Internet of Things (IoT) devices, etc.), additional opportunities are created/generated to provision data to users. The growth in the use of networks and devices, in conjunction with a need to support device mobility, imposes significant challenges on network operators and service providers. For example, conventionally tunnels or channels are created/generated as part of a connection-oriented architecture/platform to support a transmission of data from a source device to one or more destination devices, potentially by way of one or more intermediaries/intermediary devices. Thereafter, when the tunnel/channel is no longer needed (such as, for example, at the conclusion of the transmission of the data and/or at the conclusion of a communication session), the tunnel/channel may be discarded or torn down. From the perspective of the network operator/service provider, these types of tunnels/connections represent inefficiencies in terms of the signaling overhead that is required to support/facilitate their use. Still further, the use of a connection-oriented architecture/platform potentially represents a penalty in terms of latency (e.g., the time it takes a given data item, such as a packet, to traverse network infrastructure in going from a source device to a destination device) due to the additional network elements that the data item may incur along the path from the source device to the destination device.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
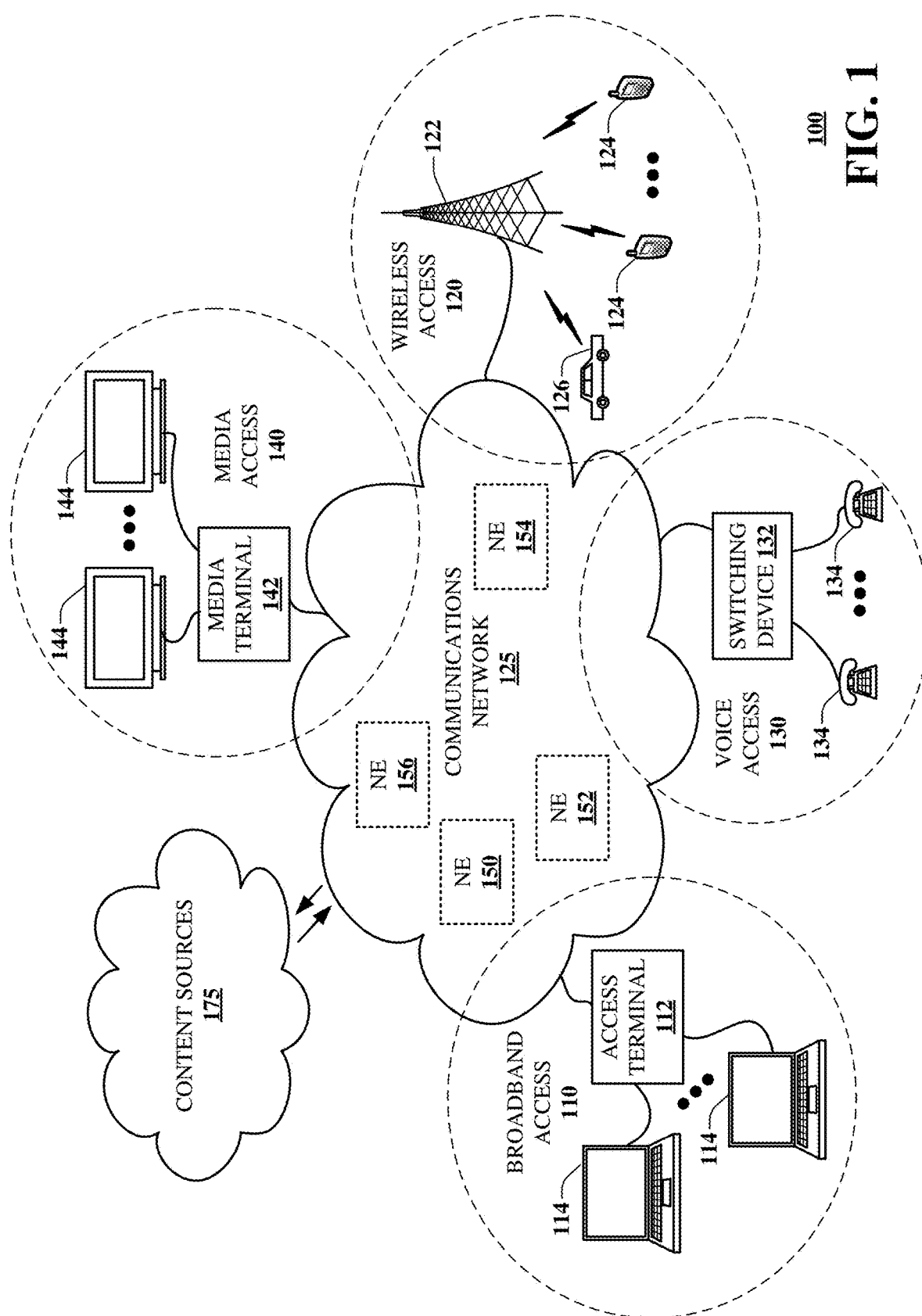
FIG. 1 is a block diagram illustrating an exemplary, non-limiting embodiment of a communications network in accordance with various aspects described herein.

The subject disclosure describes, among other things, illustrative embodiments for managing traffic, such as payload data associated with a communication service, in respect of resources (e.g., radio resources) that are used to facilitate the communication service. Other embodiments are described in the subject disclosure.

One or more aspects of the subject disclosure include, in whole or in part: obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio; based on obtaining the report, analyzing the first data and the second data; based on the analyzing, determining that a handover of the communication service from the first radio to the second radio is suggested; based on the determining, causing a first link associated with the first device to be placed in an inactive state; based on the determining, negotiating the handover of the communication service with a second device; based on the negotiating, receiving an acknowledgment from the second device that indicates an acceptance by the second device of the handover of the communication service; and based on the receiving of the acknowledgment, causing a second link associated with the second device to be placed in an active state such that first payload data associated with the communication service is transferred to the second device via the second link.

One or more aspects of the subject disclosure include, in whole or in part: transmitting first payload data associated with a communication service to a first communication device via a first link; subsequent to the transmitting of the first payload data, obtaining a first indication that a handover of the communication service is being negotiated between the first communication device and a second communication device; based on the obtaining of the first indication, placing, at a processing system, the first link in an inactive state; based on the obtaining of the first indication, storing second payload data associated with the communication service in a buffer; and responsive to obtaining a second indication that the second communication device has accepted the handover of the communication service: activating, at the processing system, a second link between the processing system and the second communication device, obtaining the second payload data from the buffer, and transmitting, based on the activating of the second link, the second payload data obtained from the buffer to the second communication device via the second link.

One or more aspects of the subject disclosure include, in whole or in part: determining, by a processing system including a processor, whether a first radio resource and a second radio resource are managed by a common controller, resulting in a determination; and based on the determination indicating that the first radio resource and the second radio resource are managed by different controllers, the different controllers including a first controller and a second controller, the first controller communicatively coupled to the first radio resource and the second controller communicatively coupled to the second radio resource: disabling, by the processing system, a first communication link between the processing system and the first controller, storing, by the processing system, first payload data associated with a communication service in a memory, obtaining, by the processing system, a first indication of whether a negotiation involving the first radio resource and the second radio resource results in a handover of the communication service to the second radio resource, wherein when the first indication indicates that the handover to the second radio resource has occurred: obtaining, by the processing system, the first payload data from the memory, and transmitting, by the processing system, the first payload data obtained from the memory to the second controller via a second communication link, and wherein when the first indication indicates that the handover to the second radio resource has not occurred: enabling, by the processing system, the first communication link, obtaining, by the processing system, the first payload data from the memory, and transmitting, by the processing system and based on the enabling of the first communication link, the first payload data obtained from the memory to the first controller via the first communication link.

Referring now to FIG. 1, a block diagram is shown illustrating an example, non-limiting embodiment of a system 100 in accordance with various aspects described herein. For example, system 100 can facilitate in whole or in part obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio; based on obtaining the report, analyzing the first data and the second data; based on the analyzing, determining that a handover of the communication service from the first radio to the second radio is suggested; based on the determining, causing a first link associated with the first device to be placed in an inactive state; based on the determining, negotiating the handover of the communication service with a second device; based on the negotiating, receiving an acknowledgment from the second device that indicates an acceptance by the second device of the handover of the communication service; and based on the receiving of the acknowledgment, causing a second link associated with the second device to be placed in an active state such that first payload data associated with the communication service is transferred to the second device via the second link. System 100 can facilitate in whole or in part transmitting first payload data associated with a communication service to a first communication device via a first link; subsequent to the transmitting of the first payload data, obtaining a first indication that a handover of the communication service is being negotiated between the first communication device and a second communication device; based on the obtaining of the first indication, placing, at a processing system, the first link in an inactive state; based on the obtaining of the first indication, storing second payload data associated with the communication service in a buffer; and responsive to obtaining a second indication that the second communication device has accepted the handover of the communication service: activating, at the processing system, a second link between the processing system and the second communication device, obtaining the second payload data from the buffer, and transmitting, based on the activating of the second link, the second payload data obtained from the buffer to the second communication device via the second link. System 100 can facilitate in whole or in part determining, by a processing system including a processor, whether a first radio resource and a second radio resource are managed by a common controller, resulting in a determination; and based on the determination indicating that the first radio resource and the second radio resource are managed by different controllers, the different controllers including a first controller and a second controller, the first controller communicatively coupled to the first radio resource and the second controller communicatively coupled to the second radio resource: disabling, by the processing system, a first communication link between the processing system and the first controller, storing, by the processing system, first payload data associated with a communication service in a memory, obtaining, by the processing system, a first indication of whether a negotiation involving the first radio resource and the second radio resource results in a handover of the communication service to the second radio resource, wherein when the first indication indicates that the handover to the second radio resource has occurred: obtaining, by the processing system, the first payload data from the memory, and transmitting, by the processing system, the first payload data obtained from the memory to the second controller via a second communication link, and wherein when the first indication indicates that the handover to the second radio resource has not occurred: enabling, by the processing system, the first communication link, obtaining, by the processing system, the first payload data from the memory, and transmitting, by the processing system and based on the enabling of the first communication link, the first payload data obtained from the memory to the first controller via the first communication link.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS)

modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
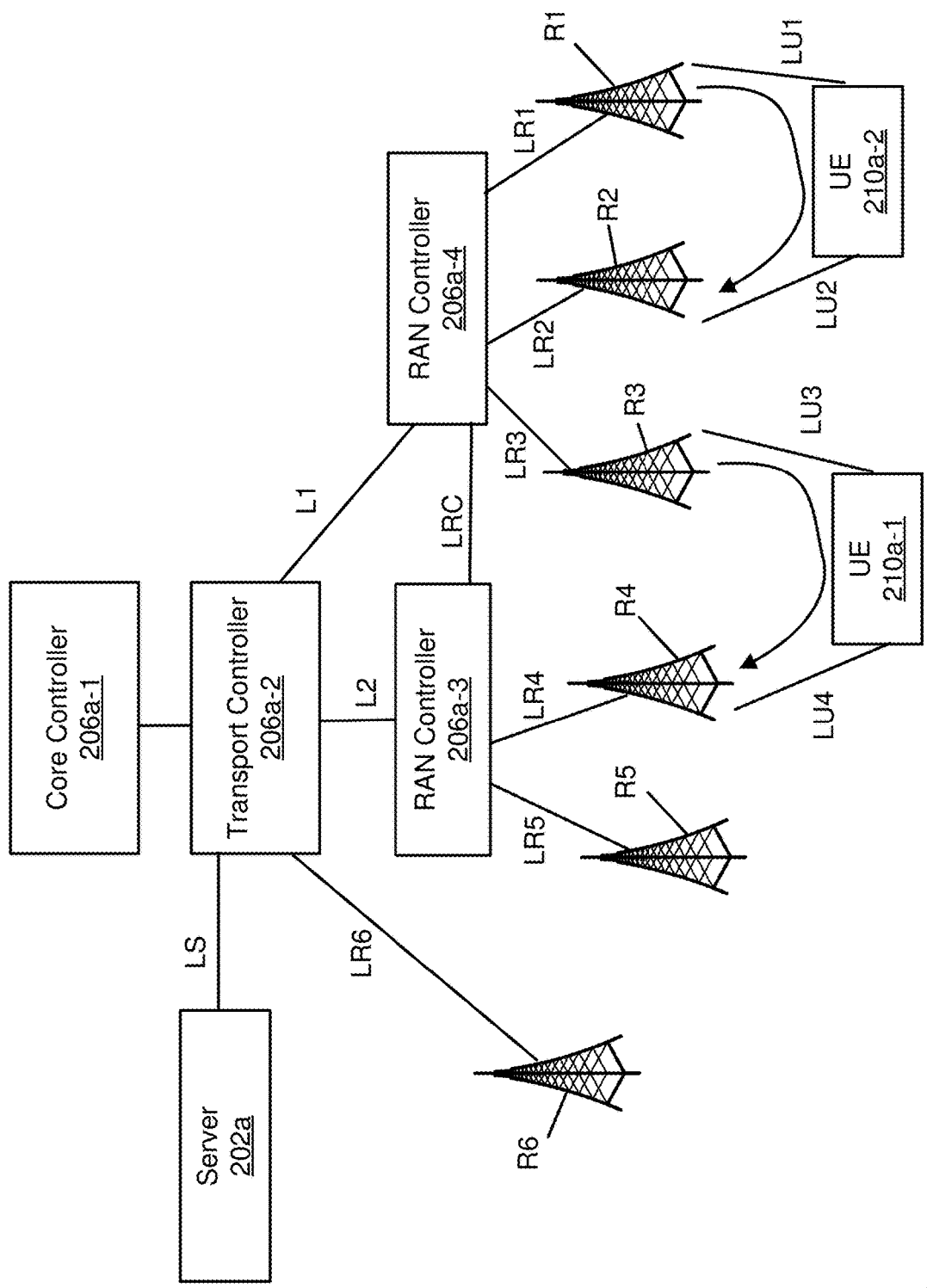
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a in accordance with various aspects described herein. In some embodiments, aspects of the system 200a may function within, or may be operatively overlaid upon, one or more portions of the system 100 of FIG. 1. Aspects of the system 200a may facilitate, or operate in accordance with, a relativistic routing protocol (RRP). RRP may seek to reduce (e.g., minimize) latency in a network, and in doing so, may exploit/achieve a higher level of network efficiency than most conventional routing protocols would obtain. RRP may incorporate/include control loops/algorithms, may monitor link state and other metadata/information, and may develop/maintain a distributed graph or topology to facilitate packet delivery (e.g., optimal packet delivery). In this regard, aspects of RRP may behave like a multi radio access technology (RAT) scheduler. Further, aspects of RRP may be utilized to simplify radio access network (RAN) mobility technology, potentially without a need for dedicated tunnels or channels. Thus, aspects of this disclosure may facilitate so-called "connectionless" mobility, as would be appreciated by one of skill in the art based on the description that follows.

As shown in FIG. 2A, the system 200a may include a server 202a, a first controller 206a-1, a second controller 206a-2, a third controller 206a-3, and a fourth controller 206a-4. Taken individually, each of the controllers 206a-1 through 206a-4 may be associated with a respective (portion of) network functionality and/or may be included/incorporated as part of one or more networks. To demonstrate, the first controller 206a-1 may be associated with a core network/core network functionality, the second controller 206a-2 may be associated with a transport network/transport network functionality, and the third controller 206a-3 and the fourth controller 206a-4 may each be associated with a RAN network/RAN network functionality. Taken collectively, the core, the transport, and the RAN may be supportive of, or may be based on, principles of RRP. More generally, each of the controllers 206a-1 through 206a-4 may be supportive of a respective tier/layer of networks or network functions/functionality.

The system 200a may include/incorporate one or more radios or towers, denoted in FIG. 2A as a first radio R1, a second radio R2, a third radio R3, a fourth radio R4, a fifth radio R5, and a sixth radio R6. The number/count of radios (R1 through R6) in FIG. 2A is illustrative, which is to say that some embodiments may include a different number/count of radios. Similarly, the number/count of servers (e.g., server 202a) and/or controllers (e.g., controllers 206a-1 through 206a-4) that are included in a given embodiment may be different from what is shown in FIG. 2A.

Taken collectively, the server 202a, the controllers 206a-1 through 206a-4 and the radios R1 through R6 may facilitate a distributed computing architecture/platform, where functionality associated with various operations may be resident/execute, in whole or in part, at multiple locations. In some embodiments, functionality may be consolidated/resident at a singular location.

The first/core controller 206a-1 may provide for core network functionality, such as for example functions related to billing, authentication, security, and the like. The second/transport controller 206a-2 may oversee/manage aspects directed to a transport of data within the system 200a. The third and fourth RAN controllers 206a-3 and 206a-4 may facilitate a conveyance of data (e.g., payload data associated with one or more communication services) between the transport controller 206a-2 and various ones of the radios R1 through R6. In the particular embodiment shown in FIG. 2A, the radios R1 through R3 may each be associated with the RAN controller 206a-4, the radios R4 and R5 may each be associated with the RAN controller 206a-3, and the radio R6 might not (specifically) be associated with any RAN controller. In this regard, aspects/functionality of a RAN controller (such as, for example, the RAN controllers 206a-3 and 206a-4) may be included/incorporated at the transport controller 206a-2 and/or the radio R6. The radios R1 through R6 may be coupled to the aforementioned, respective entities via one or more links, such as for example via links LR1, LR2, LR3, LR4, LR5, and LR6 as shown in FIG. 2A.

The system 200a may accommodate/facilitate communication services in respect of various types of communication devices. To demonstrate, FIG. 2A depicts a first user equipment (UE) 210a-1 and a second UE 210a-2. Due to changes in conditions (e.g., obstacles entering or departing from a line-of-sight between a UE and a radio/tower, user or UE mobility, changes in loads, etc., or any combination thereof), a given radio that is being utilized to provision services to a given UE might cease to be the best radio to continue providing those services. In this regard, in FIG. 2A a first scenario is depicted where the UE 210a-1 (initially) obtains communication services via the radio R3 (and its associated link LU3), but then the radio R4 (and its associated link LU4) is identified as potentially being a better radio to provision services to UE 210a-1. Similarly, in FIG. 2A a second scenario is depicted where the UE 210a-2 (initially)

obtains communication services via the radio R1 (and its associated link LU1), but then the radio R2 (and its associated link LU2) is identified as potentially being a better radio to provision services to UE 210a-2. The two scenarios just mentioned differ from one another in the sense that the first scenario involving the UE 210a-1 incorporates multiple RAN controllers (due to the fact that the radios R3 and R4 are associated with different RAN controllers, namely the RAN controllers 206a-4 and 206a-3, respectively) and the second scenario involving the UE 210a-2 involves a single RAN controller (due to the fact that the radios R1 and R2 are associated with a common RAN controller, namely the RAN controller 206a-4). In general, both of scenarios may entail a handover of a communication session or communication services involving a given communication device (e.g., a given UE) from an initial radio to at least one other radio.

Continuing the first scenario set forth above, and assuming that the UE 210a-1 has been authenticated for service (to the extent that authentication is included as part of the operations of the system 200a, such as part of the operations of the core controller 206a-1), the server 202a may transmit/transfer data/data packets destined for the UE 202a-1 in the downlink direction by way of a server link (LS) to the transport controller 206a-2. The transport controller 206a-2, in turn, may send the data (subject to any conditioning, formatting, or modification that may be provided by the transport controller 206a-2) to the RAN controller 206a-4 by way of a link L1. The RAN controller 206a-4 may provide the data (subject to any conditioning, formatting, or modification that may be provided by the RAN controller 206a-4) to the radio R3, by way of link LR3, for transmission to the UE 210a-1 via the link LU3. A similar transfer of data may occur in the uplink direction; e.g., data may be transferred from the UE 210a-1 to the server 202a by way of the radio R3, the RAN controller 206a-4, and the transport controller 206a-2 (and via the links between those entities as shown in FIG. 2A).

In response to a request, in response to a change in conditions, in response to an occurrence of an event, and/or periodically or as part of a schedule, the UE 210a-1 may send a report that includes an indication of signal qualities associated with radios that are within a communication range of the UE 210a-1. To demonstrate, and as part of this exemplary first scenario, the UE 210a-1 may send a report to the RAN controller 206a-4 (by way of the radio R3) that is representative of, or includes, measurements of parameters pertaining to a reference signal received power (RSRP) and/or a reference signal received quality (RSRQ) associated with the radios R3 and R4. Based on receiving the report from the UE 210a-1, the RAN controller 206a-4 may process/analyze the parameters of the report (potentially in combination with other parameters, such as an identification of respective loads associated with each of the radios R3 and R4) and determine that the radio R4 is a better radio for providing services (e.g., data transfer services) to the UE 210a-1 than the radio R3. Stated differently, the RAN controller 206a-4 may determine that services associated with/provided to the UE 210a-1 should be handed over from the radio R3 to the radio R4.

As part of the determination described immediately above, the RAN controller 206a-4 may signal to the transport controller 206a-2 that the transport controller 206a-2 should, at least for the time being, cease sending data destined for the UE 210a-1 to the RAN controller 206a-4 by way of the link L1. As part of that signaling, the transport controller 206a-2 may: (1) temporarily store data from the server 202a that is destined for the UE 210a-1 in a buffer or memory, (2) set a timer to an initial value, and (3) initiate a counting (e.g., a countdown) of the timer from the initial value to another value (e.g., zero). When the timer reaches the another value (e.g., when the timer reaches zero), the transport controller 206a-2 may be free to overwrite/purge the buffered/stored data; in this manner, the transport controller 206a-2 might not be tasked/obligated to store data for the UE 210a-1 indefinitely (e.g., the transport controller 206a-2 might only be required to store/buffer the data for the UE 210a-1 for the duration of the timer). The duration of the timer may be set/selected to provide the UE 210a-1 (or associated network infrastructure) with a fair chance/opportunity to establish communications with the new target/destination radio (R4 in this particular example) or to re-establish communications with the initial radio (R3 in this particular example).

Additionally, and as part of the determination described above, the RAN controller 206a-4 may signal to the RAN controller 206a-3 (potentially as part of a message directed to the RAN controller 206a-3) via a link LRC that the RAN controller 206a-4 believes that services for the UE 210a-1 should be provisioned by the RAN controller 206a-3 and/or the radio R4. The signaling/messaging as between the RAN controller 206a-3 and the RAN controller 206a-4 by way of the link LRC may correspond to a negotiation as to which of the two controllers (or associated radios) is to provide services to the UE 210a-1 going forward.

Assuming that the RAN controller 206a-3 accepts the request from the RAN controller 206a-4 as part of the negotiation, the RAN controller 206a-3 may send an acknowledgement (by way of the link LRC) to the RAN controller 206a-4 indicative of the acceptance. In response to receiving the acknowledgement, the RAN controller 206a-4 may: (1) signal to the UE 210a-1 that data from the UE 210a-1 should be sent to the radio R4, and (2) signal to the transport controller 206a-2 (by way of the link L1) that data destined for the UE 210a-1 should be conveyed to the RAN controller 206a-3 (by way of a link L2). In response to (2), the transport controller 206a-2 may transfer data destined for the UE 210a-1 that may have been buffered/stored at the transport controller 206a-2 to the RAN controller 206a-3 by way of the link L2; going forward, and in the absence of further handoffs/handovers in respect of services to be provisioned to the UE 210a-1, any additional data destined for the UE 210a-1 may be conveyed to the UE 210a-1 by way of the transport controller 206a-2, the RAN controller 206a-3, and the radio R4. In this respect, the handover from the RAN controller 206a-4/radio R3 to the RAN controller 206a-3/radio R4 may be seamless in the downlink direction—e.g., from a data continuity perspective, it may appear to the UE 210a-1 that no handover occurred, which is to say that data might not be lost as part of the handover.

If the RAN controller 206a-3 declined/denied/rejected the request from the RAN controller 206a-4 to transfer/handover services for the UE 210a-1 to the RAN controller 206a-3 (where such rejection may be communicated via the link LRC), or failed to accept the request within a threshold amount of time, the RAN controller 206a-3 may signal to the transport controller 206a-2 that the transport controller 206a-2 should send any data destined for the UE 210a-1 (inclusive of any data for the UE 210a-1 that may have been buffered/stored at the transport controller 206a-2) to the RAN controller 206a-4. In this manner, the RAN controller 206a-4 may effectively re-establish communications with the UE 210a-1 (by way of the radio R3) if the RAN controller 206*a*-4 is unable to successfully negotiate a handover to another RAN controller (the RAN controller 206*a*-3 in this example).

As the example of the first scenario described above illustrates, the signaling between the transport controller 206*a*-2 and the RAN controller 206*a*-4 may serve to suspend a transfer of data between those entities during a (potential) handover—at least until it is confirmed that the RAN controller 206*a*-4 will continue providing services to the UE 210*a*-1. This can be helpful, because if the handover is successful the data destined for the UE 210*a*-1 would not have to be forwarded by the RAN controller 206*a*-4 (by way of a connection, channel, or tunnel) to the new RAN controller (e.g., where the new RAN controller is the RAN controller 206*a*-3 in the foregoing example). In this manner, an efficiency of network resources (inclusive of resources associated with the RAN controller 206*a*-4) may be enhanced.

Turning now to the second scenario referenced above (where the UE 210*a*-2 (initially) obtains communication services via the radio R1, but then the radio R2 is identified as potentially being a better radio to provision services to UE 210*a*-2), the UE 210*a*-2 may send a report to the RAN controller 206*a*-4 that is representative of, or includes, measurements of parameters pertaining to a reference signal received power (RSRP) and/or a reference signal received quality (RSRQ) associated with radios that are in communication range of the UE 210*a*-2, such as for example the radios R1 and R2. Based on receiving the report from the UE 210*a*-2, the RAN controller 206*a*-4 may process the parameters of the report (potentially in combination with other parameters, such as an identification of respective loads associated with each of the radios R1 and R2) and determine that the radio R2 is a better radio for providing services (e.g., data transfer services) to the UE 210*a*-2 than the radio R1. Stated differently, the RAN controller 206*a*-4 may determine that services associated with the UE 210*a*-2 should be handed over from the radio R1 to the radio R2.

Since the potential handover in respect of the UE 210*a*-2 is an intra-controller handover (which is to say that both of the radios R1 and R2 are associated with a common RAN controller—namely, the RAN controller 206*a*-4), the link L1 may continue to be used irrespective of whether the handover from the radio R1 to the radio R2 is successful/occurs. In this respect, the RAN controller 206*a*-4 may effectively "negotiate with itself" (or may conduct a negotiation amongst the resources associated with the radios R1 and R2) to determine whether the handover from the radio R1 to the radio R2 should, in fact, occur. Assuming that the determination indicates that the handover will/should occur, the RAN controller 206*a*-4 may cause a message or signal to be sent to the UE 210*a*-2 (by way of the radio R1/the link LU1) to cause the UE 210*a*-2 to obtain communication services by way of the radio R2/the link LU2. For example, and assuming that the radios R1 and R2 utilize different frequencies or frequency bands, the message/signal that is sent to the UE 210*a*-2 may cause the UE 210*a*-2 to change from utilizing a first frequency or first frequency band to a second frequency or second frequency band. In some embodiments, the message/signal that is sent to the UE 210*a*-2 may cause the UE 210*a*-2 to change from using a first RAT associated with the radio R1 to using a second RAT associated with the radio R2, where the first RAT and the second RAT may be different from one another.

In some instances/scenarios (potentially inclusive of the scenarios described above), during a potential handover from a first resource (e.g., a first entity/device) to a second resource (e.g., a second entity/device), the UE that is potentially the subject of the handover may be instructed to buffer/hold data that is intended to be conveyed by the UE in an uplink direction until a determination is made whether the handover is going to occur or not. Instructing the UE to buffer/hold the data may help to avoid having to forward that data on from the first resource to the second resource in the event of a handover from the first resource to the second resource, while still ensuring that no data provided/transmitted by the UE is lost. Alternatively, and in the event of a handover, the first resource may be tasked with the responsibility of forwarding data to the second resource to avoid requiring the UE buffer/hold the data, while still ensuring that no data provided by the UE is lost. Still further, in some embodiments data that is transmitted/provided by the UE might not be guaranteed to be received and acted upon by the network infrastructure/resources during the handover process, which is to say that in such embodiments data that is transmitted by the UE may be lost, and hence, may need to be retransmitted by the UE (assuming that the data that was lost is "important" or needs to be acted on). The particular variant(s) that is/are used in a given embodiment may be based on an identification of a capability of the UE (e.g., if the UE has a sufficiently sized memory/buffer, instructing the UE to buffer the data during a potential handover may be preferred to reduce network traffic), guarantees of quality of service that the UE may be entitled to (e.g., if the UE is guaranteed that an amount of data that is lost will be less than a threshold (potentially in conjunction with a user paying a fee or the like), it may be preferable to forward the data from the first resource to the second resource in the event of an actual handover to avoid imposing additional cost/burden/complexity on the UE), etc.

Figure 2B:
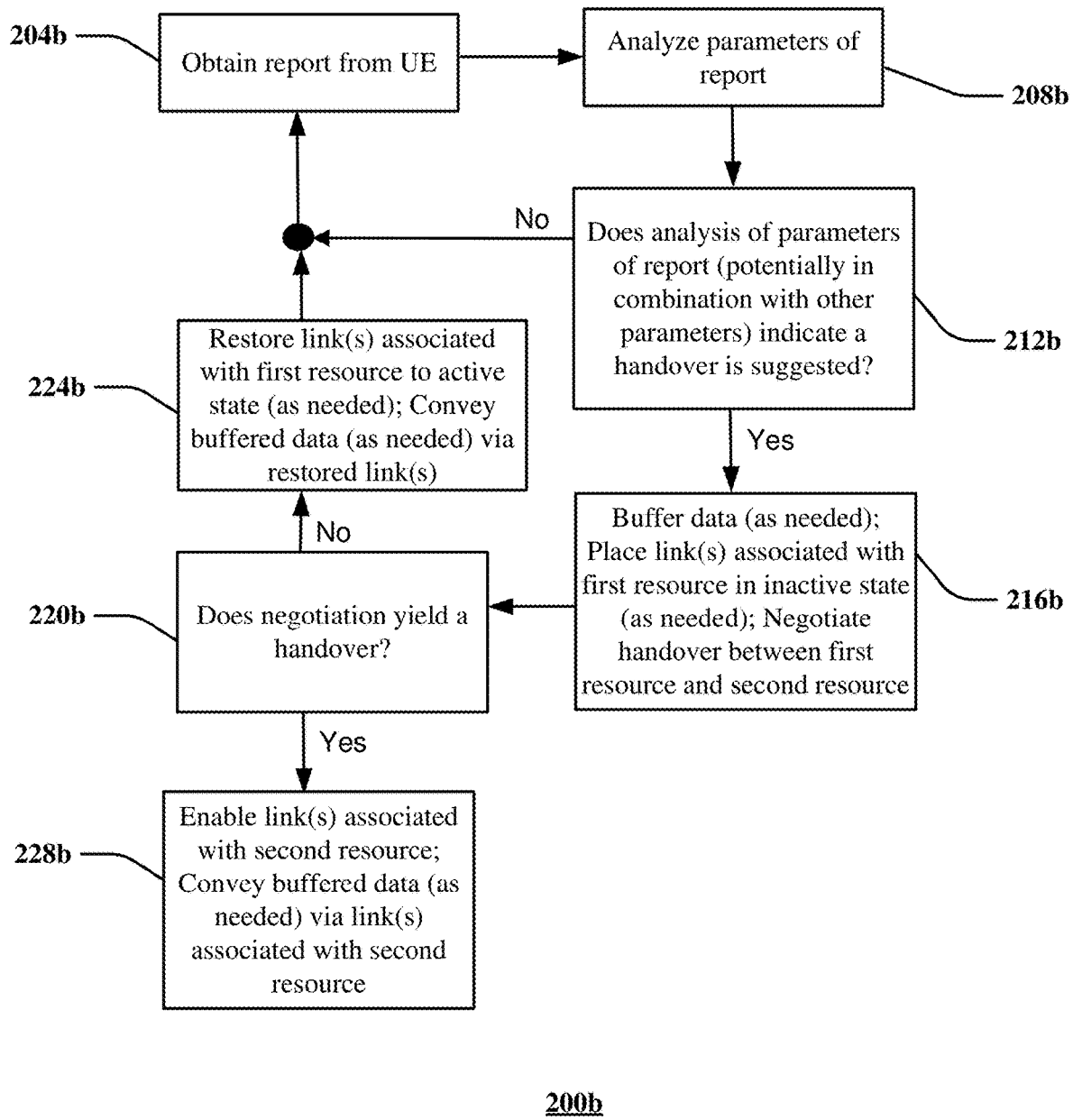
FIG. 2B depicts an illustrative embodiment of a method in accordance with various aspects described herein.

Referring now to FIG. 2B, an illustrative embodiment of a method 200*b* in accordance with various aspects described herein is shown. The method 200*b* may be implemented (e.g., executed), in whole or in part, in conjunction with one or more systems, devices, and/or components, such as for example the systems, devices, and components described herein. The method 200*b* may facilitate communication services in respect of a communication device, such as for example a user equipment (UE). In particular, the method 200*b* may be used to manage resources and link associated with a provision of communication services to the UE.

In block 204*b*, a report may be obtained from the UE. The report may be obtained based on a schedule (e.g., may be obtained periodically), may be obtained based on a transmission of a request to the UE for the report, may be obtained based on an occurrence of one or more events or in response to one or more conditions, etc., or any combination thereof. As part of block 204*b*, the report may be obtained from the UE using a communication link associated with a first resource (e.g., a first radio). The report may include values for parameters associated with a quality of a communication service. For example, the report may include values associated with RSRP and/or RSRQ for one or more signals associated with one or more radios that may be within a communication range of the UE, potentially inclusive of the first radio. The values of the parameters may be included/incorporated in the report as data.

In block 208*b*, the parameters/data of the report of block 204*b* may be analyzed. For example, block 208*b* may include comparing the values of the parameters to one or more thresholds and/or comparing the values of the parameters associated with the first resource (e.g., the first radio) to values of the parameters associated with other resources (e.g., one or more other radios).

In block 212*b*, a determination may be made regarding whether the analysis of the parameters of block 212*b*, potentially in combination with an analysis of other parameters, indicates that a handover from the first resource to another resource (e.g., a second resource) is suggested. The other parameters in this context may include an identification or comparison of loads as between the first resource and the second resource, an identification of a communication capability of the UE and/or the first and second resources, an identification of an application that is executed by the UE, an identification of a quality of service that is owed to the UE as part of a communication service, etc., or any combination thereof.

If the determination of block 212*b* indicates that no handover is suggested, then the method 200*b* may proceed from block 212*b* to block 204*b*. As part of the loop from block 212*b* to block 204*b*, reports may continue to be obtained from the UE, as described above, to ensure that no handover is needed. Conversely, if the determination of block 212*b* indicates that a handover is suggested, flow may proceed from block 212*b* to block 216*b*.

In block 216*b*, first data that might otherwise have been conveyed to the UE may be stored/buffered and second data that might otherwise have been conveyed by the UE or on behalf of the UE may be stored/buffered. In the case of a potential inter-controller or inter-resource handover, such as in the case of the first scenario described above in respect of the UE 210*a*-1 of FIG. 2A, the buffering of the first data may occur at the transport controller 206*a*-2 and the buffering of the second data may occur at the UE 210*a*-1, at the RAN controller 206*a*-4, or at the transport controller 206*a*-2. In the case of a potential intra-controller or intra-resource handover, such as in the case of the second scenario described above in respect of the UE 210*a*-2 of FIG. 2A, the buffering of the first data may occur at the RAN controller 206*a*-4 and the buffering of the second data may occur at the UE 210*a*-2. More generally, the locations of any potential buffering may be determined based on trading off complexity/burdens that are to be imposed on particular entities or devices relative to a goal of enhancing resource efficiency.

As part of block 216*b*, links associated with the first resource may be placed in an inactive/disabled state. For example, and again referring to the first scenario associated with UE 210*a*-1, block 216*b* may include disabling the link L1, disabling the link LR3 between the RAN controller 206*a*-4 and the radio R3, and/or disabling the link LU3 between the UE 210*a*-1 and the radio R3. In respect of the second scenario associated with the UE 210*a*-2, block 216*b* may include disabling the link LU1 between the UE 210*a*-2 and the radio R1 and/or disabling the link LR1 between the RAN controller 206*a*-4 and the radio R1.

As part of block 216*b*, a negotiation may be conducted/performed in respect of the first resource and the second resource. In block 220*b*, a determination may be made, based on the negotiation of block 216*b*, whether a handover is appropriate/warranted. If not, flow may proceed from block 220*b* to block 224*b*. Otherwise, if a handover is appropriate/warranted, flow may proceed from block 220*b* to block 228*b*.

In block 224*b*, links that may have been disabled as part of block 216*b* may be restored to an active/enabled state. To the extent that any data was buffered as part of block 216*b*, signals or messages may be generated as part of block 224*b* to cause the buffered data to be conveyed to its intended destination using the restored links. In this manner, the buffered data might not be lost as a result of the negotiation or the placing of the various links in the inactive/disabled state as part of block 216*b*.

In block 228*b*, links associated with the second resource may be enabled/activated. In the context of the first scenario associated with/involving the UE 210*a*-1 described above, block 228*b* may entail enabling/activating the link L2, the link LR4, and/or the link LU4. In the context of the second scenario associated with UE 210*a*-2 described above, block 228*b* may entail enabling/activating the link LR2 and/or the link LU2.

To the extent that any data was buffered as part of block 216*b*, signals or messages may be generated as part of block 228*b* to cause the buffered data to be conveyed to its intended destination using the links enabled/activated as part of block 228*b*. In this manner, the buffered data might not be lost as a result of the negotiation or the placing of the various links in the inactive/disabled state as part of block 216*b*.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In some embodiments, the method 200*b* may be executed repeatedly or iteratively to monitor conditions for handover associated with communication services that are provisioned to a UE. For example, and assuming that a handover does occur during a first execution of the method 200*b* (e.g., the "yes" path is taken out of block 220*b*), the next execution of the method 200*b* may result in the "first resource" assuming the identity of the second resource from the prior execution of the method 200*b*. To generalize, the "first resource" may be assumed to be a "currently serving resource" and the "second resource" may be assumed to be a "candidate resource" that may become the "currently service resource" in the event that a handover occurs.

As described above, aspects of the disclosure may be based on RRP. In some embodiments, a value for a parameter (e.g., a "latency" parameter) of RRP may be set to a first value (e.g., 1 ms) to denote that a link between two entities is to be used in a conveyance of data and may be set to a second value (e.g., a value of "infinity", or some other value) to denote that the link should not be used to convey data. In this regard, the value of the parameter may be analogized to a switch, with an on/enabled/active state or an off/disabled/inactive state. In some embodiments, signaling/messaging/directing a particular entity to do something may occur over a control plane, whereas a user plane or data plane may be used to transfer application data or payload data. Aspects of this disclosure may be utilized to reduce the transfer of application/payload data, which can enhance the productive efficiency of network resources. Stated differently, and all other conditions being equal, the control plane signaling may generally be less than the user/data plane signaling; this is especially true in the context of high-quality, data-rich applications whereby the amount of user/data plane signaling/traffic may be substantially larger than the control plane signaling/traffic. Thus, from the perspective of enhancing efficiency in terms of resource utilization, it may be desirable for a network operator or service provider to focus on reducing the costs/burdens associated with having to transfer user/data plane signals/traffic (even if that is accompanied by a slight increase in control plane signaling/traffic).

As set forth herein, aspects of this disclosure may be incorporated/integrated as part of one or more practical applications. For example, aspects of this disclosure may be used at part of one or more radio access networks (RANs) that may utilize one or more radio access technologies (RATs) in facilitating/providing communication services. Aspects of this disclosure may be included/incorporated as part of one or more computing technologies, inclusive of cloud computing platforms/architectures, peer-to-peer networks, distributed computing architectures/platforms, etc., or any combination thereof. Various embodiments of this disclosure may reduce, or even completely eliminate, a need for dedicated channels/tunnels to convey data between devices (such as network elements). The reduction/elimination in signaling overhead associated with such channels/tunnels may improve network/system efficiency, and thus, this reduction/elimination represents substantial improvements relative to conventional technologies. Furthermore, in some embodiments handovers of communication sessions may execute faster (e.g., on the order of milliseconds, as compared to tens-of-milliseconds), potentially in a seamless and losses fashion, thereby enhancing the reliability and quality of communication services. Still further, operations required of network elements/components and user equipment may be reduced, which may enable communication resources to be allocated to more productive uses. The reduction in operational complexity may reduce power dissipation; in this respect, user equipment (UE) battery life may be extended (to the extent that the UE obtains power via a battery source).

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio; based on obtaining the report, analyzing the first data and the second data; based on the analyzing, determining that a handover of the communication service from the first radio to the second radio is suggested; based on the determining, causing a first link associated with the first device to be placed in an inactive state; based on the determining, negotiating the handover of the communication service with a second device; based on the negotiating, receiving an acknowledgment from the second device that indicates an acceptance by the second device of the handover of the communication service; and based on the receiving of the acknowledgment, causing a second link associated with the second device to be placed in an active state such that first payload data associated with the communication service is transferred to the second device via the second link. Virtualized communication network 300 can facilitate in whole or in part transmitting first payload data associated with a communication service to a first communication device via a first link; subsequent to the transmitting of the first payload data, obtaining a first indication that a handover of the communication service is being negotiated between the first communication device and a second communication device; based on the obtaining of the first indication, placing, at a processing system, the first link in an inactive state; based on the obtaining of the first indication, storing second payload data associated with the communication service in a buffer; and responsive to obtaining a second indication that the second communication device has accepted the handover of the communication service: activating, at the processing system, a second link between the processing system and the second communication device, obtaining the second payload data from the buffer, and transmitting, based on the activating of the second link, the second payload data obtained from the buffer to the second communication device via the second link. Virtualized communication network 300 can facilitate in whole or in part determining, by a processing system including a processor, whether a first radio resource and a second radio resource are managed by a common controller, resulting in a determination; and based on the determination indicating that the first radio resource and the second radio resource are managed by different controllers, the different controllers including a first controller and a second controller, the first controller communicatively coupled to the first radio resource and the second controller communicatively coupled to the second radio resource: disabling, by the processing system, a first communication link between the processing system and the first controller, storing, by the processing system, first payload data associated with a communication service in a memory, obtaining, by the processing system, a first indication of whether a negotiation involving the first radio resource and the second radio resource results in a handover of the communication service to the second radio resource, wherein when the first indication indicates that the handover to the second radio resource has occurred: obtaining, by the processing system, the first payload data from the memory, and transmitting, by the processing system, the first payload data obtained from the memory to the second controller via a second communication link, and wherein when the first indication indicates that the handover to the second radio resource has not occurred: enabling, by the processing system, the first communication link, obtaining, by the processing system, the first payload data from the memory, and transmitting, by the processing system and based on the enabling of the first communication link, the first payload data obtained from the memory to the first controller via the first communication link.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
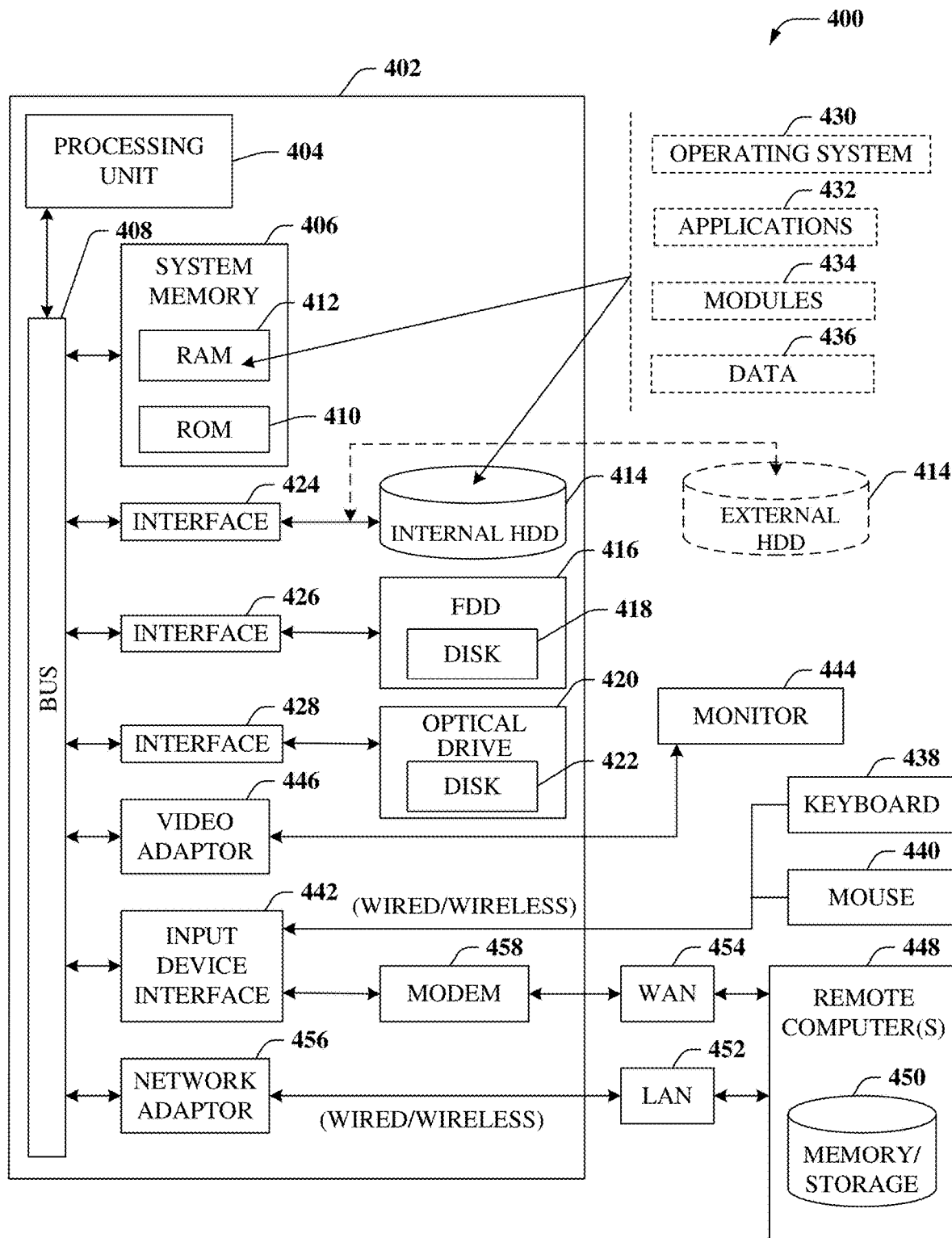
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio; based on obtaining the report, analyzing the first data and the second data; based on the analyzing, determining that a handover of the communication service from the first radio to the second radio is suggested; based on the determining, causing a first link associated with the first device to be placed in an inactive state; based on the determining, negotiating the handover of the communication service with a second device; based on the negotiating, receiving an acknowledgment from the second device that indicates an acceptance by the second device of the handover of the communication service; and based on the receiving of the acknowledgment, causing a second link associated with the second device to be placed in an active state such that first payload data associated with the communication service is transferred to the second device via the second link. Computing environment 400 can facilitate in whole or in part transmitting first payload data associated with a communication service to a first communication device via a first link; subsequent to the transmitting of the first payload data, obtaining a first indication that a handover of the communication service is being negotiated between the first communication device and a second communication device; based on the obtaining of the first indication, placing, at a processing system, the first link in an inactive state; based on the obtaining of the first indication, storing second payload data associated with the communication service in a buffer; and responsive to obtaining a second indication that the second communication device has accepted the handover of the communication service: activating, at the processing system, a second link between the processing system and the second communication device, obtaining the second payload data from the buffer, and transmitting, based on the activating of the second link, the second payload data obtained from the buffer to the second communication device via the second link. Computing environment 400 can facilitate in whole or in part determining, by a processing system including a processor, whether a first radio resource and a second radio resource are managed by a common controller, resulting in a determination; and based on the determination indicating that the first radio resource and the second radio resource are managed by different controllers, the different controllers including a first controller and a second controller, the first controller communicatively coupled to the first radio resource and the second controller communicatively coupled to the second radio resource: disabling, by the processing system, a first communication link between the processing system and the first controller, storing, by the processing system, first payload data associated with a communication service in a memory, obtaining, by the processing system, a first indication of whether a negotiation involving the first radio resource and the second radio resource results in a handover of the communication service to the second radio resource, wherein when the first indication indicates that the handover to the second radio resource has occurred: obtaining, by the processing system, the first payload data from the memory, and transmitting, by the processing system, the first payload data obtained from the memory to the second controller via a second communication link, and wherein when the first indication indicates that the handover to the second radio resource has not occurred: enabling, by the processing system, the first communication link, obtaining, by the processing system, the first payload data from the memory, and transmitting, by the processing system and based on the enabling of the first communication link, the first payload data obtained from the memory to the first controller via the first communication link.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
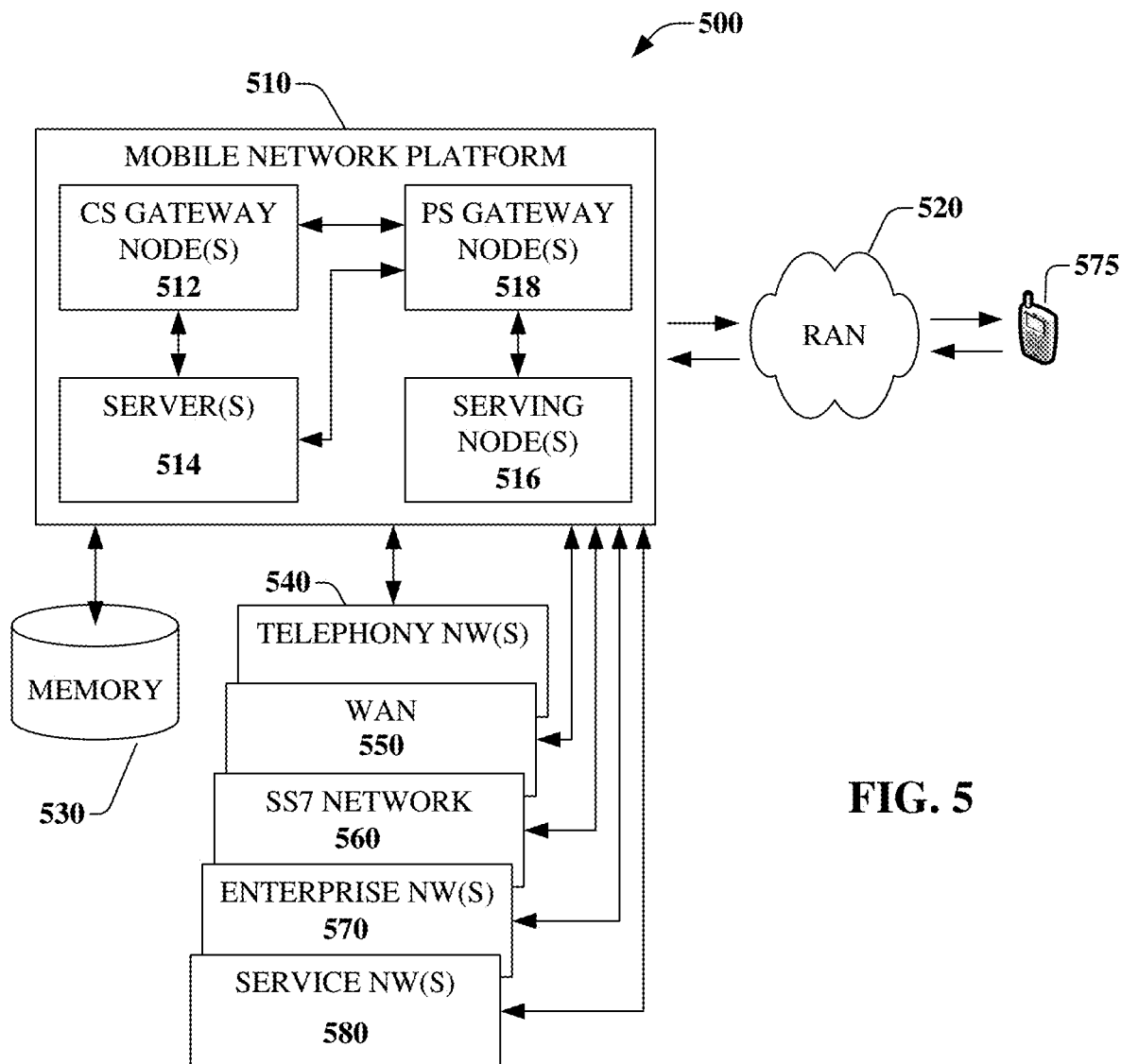
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio; based on obtaining the report, analyzing the first data and the second data; based on the analyzing, determining that a handover of the communication service from the first radio to the second radio is suggested; based on the determining, causing a first link associated with the first device to be placed in an inactive state; based on the determining, negotiating the handover of the communication service with a second device; based on the negotiating, receiving an acknowledgment from the second device that indicates an acceptance by the second device of the handover of the communication service; and based on the receiving of the acknowledgment, causing a second link associated with the second device to be placed in an active state such that first payload data associated with the communication service is transferred to the second device via the second link. Platform 510 can facilitate in whole or in part transmitting first payload data associated with a communication service to a first communication device via a first link; subsequent to the transmitting of the first payload data, obtaining a first indication that a handover of the communication service is being negotiated between the first communication device and a second communication device; based on the obtaining of the first indication, placing, at a processing system, the first link in an inactive state; based on the obtaining of the first indication, storing second payload data associated with the communication service in a buffer; and responsive to obtaining a second indication that the second communication device has accepted the handover of the communication service: activating, at the processing system, a second link between the processing system and the second communication device, obtaining the second payload data from the buffer, and transmitting, based on the activating of the second link, the second payload data obtained from the buffer to the second communication device via the second link. Platform 510 can facilitate in whole or in part determining, by a processing system including a processor, whether a first radio resource and a second radio resource are managed by a common controller, resulting in a determination; and based on the determination indicating that the first radio resource and the second radio resource are managed by different controllers, the different controllers including a first controller and a second controller, the first controller communicatively coupled to the first radio resource and the second controller communicatively coupled to the second radio resource: disabling, by the processing system, a first communication link between the processing system and the first controller, storing, by the processing system, first payload data associated with a communication service in a memory, obtaining, by the processing system, a first indication of whether a negotiation involving the first radio resource and the second radio resource results in a handover of the communication service to the second radio resource, wherein when the first indication indicates that the handover to the second radio resource has occurred: obtaining, by the processing system, the first payload data from the memory, and transmitting, by the processing system, the first payload data obtained from the memory to the second controller via a second communication link, and wherein when the first indication indicates that the handover to the second radio resource has not occurred: enabling, by the processing system, the first communication link, obtaining, by the processing system, the first payload data from the memory, and transmitting, by the processing system and based on the enabling of the first communication link, the first payload data obtained from the memory to the first controller via the first communication link.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
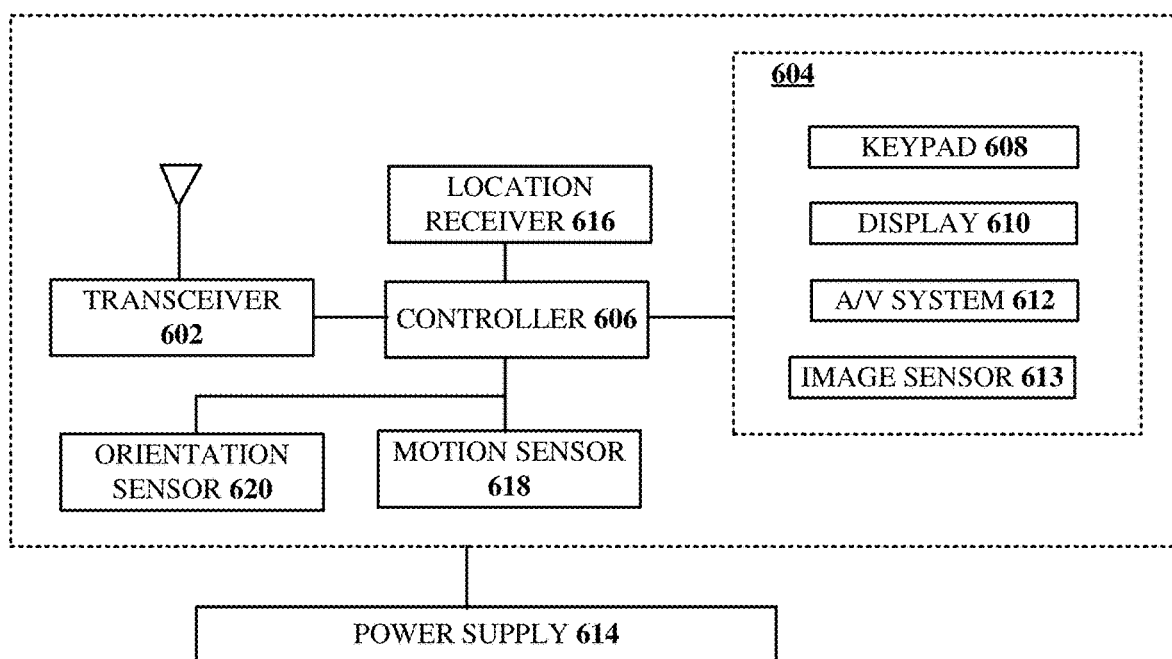
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio; based on obtaining the report, analyzing the first data and the second data; based on the analyzing, determining that a handover of the communication service from the first radio to the second radio is suggested; based on the determining, causing a first link associated with the first device to be placed in an inactive state; based on the determining, negotiating the handover of the communication service with a second device; based on the negotiating, receiving an acknowledgment from the second device that indicates an acceptance by the second device of the handover of the communication service; and based on the receiving of the acknowledgment, causing a second link associated with the second device to be placed in an active state such that first payload data associated with the communication service is transferred to the second device via the second link. Computing device 600 can facilitate in whole or in part transmitting first payload data associated with a communication service to a first communication device via a first link; subsequent to the transmitting of the first payload data, obtaining a first indication that a handover of the communication service is being negotiated between the first communication device and a second communication device; based on the obtaining of the first indication, placing, at a processing system, the first link in an inactive state; based on the obtaining of the first indication, storing second payload data associated with the communication service in a buffer; and responsive to obtaining a second indication that the second communication device has accepted the handover of the communication service: activating, at the processing system, a second link between the processing system and the second communication device, obtaining the second payload data from the buffer, and transmitting, based on the activating of the second link, the second payload data obtained from the buffer to the second communication device via the second link. Computing device 600 can facilitate in whole or in part determining, by a processing system including a processor, whether a first radio resource and a second radio resource are managed by a common controller, resulting in a determination; and based on the determination indicating that the first radio resource and the second radio resource are managed by different controllers, the different controllers including a first controller and a second controller, the first controller communicatively coupled to the first radio resource and the second controller communicatively coupled to the second radio resource: disabling, by the processing system, a first communication link between the processing system and the first controller, storing, by the processing system, first payload data associated with a communication service in a memory, obtaining, by the processing system, a first indication of whether a negotiation involving the first radio resource and the second radio resource results in a handover of the communication service to the second radio resource, wherein when the first indication indicates that the handover to the second radio resource has occurred: obtaining, by the processing system, the first payload data from the memory, and transmitting, by the processing system, the first payload data obtained from the memory to the second controller via a second communication link, and wherein when the first indication indicates that the handover to the second radio resource has not occurred: enabling, by the processing system, the first communication link, obtaining, by the processing system, the first payload data from the memory, and transmitting, by the processing system and based on the enabling of the first communication link, the first payload data obtained from the memory to the first controller via the first communication link.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4 \ldots xn)$, to a confidence that the input belongs to a class, that is, $f(x)$=confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A first device, comprising:
a processing system including a processor; and
a memory that stores executable instructions that, when executed by the processing system, facilitate performance of operations, the operations comprising:
obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio;
based on obtaining the report, analyzing the first data and the second data;
based on the analyzing, determining that a handover of the communication service from the first radio to the second radio is suggested;
based on the determining, causing a first link associated with the first device to be placed in an inactive state, wherein the first link is coupled to the first device and a third device;
based on the determining, negotiating the handover of the communication service with a second device, wherein the causing of the first link associated with the first device to be placed in the inactive state causes the third device to store in a buffer a first payload data associated with the communication service at the third device while the handover of the communication service is negotiated with the second device;
based on the determining, causing the third device to set a timer to an initial value, and initiate a counting of the timer such that when the timer reaches another value that is different from the initial value the third device is free to purge the first payload data from the buffer;
based on the negotiating, receiving an acknowledgment from the second device that indicates an acceptance by the second device of the handover of the communication service; and based on the receiving of the acknowledgment, causing a second link associated with the second device to be placed in an active state such that the first payload data is transferred to the second device via the second link.

2. The first device of claim 1, wherein the operations further comprise: obtaining, prior to the analyzing, second payload data associated with the communication service via the first link.

3. The first device of claim 2, wherein the operations further comprise: providing the second payload data to the first radio to cause the first radio to transmit the second payload data to the user equipment.

4. The first device of claim 1, wherein the causing of the second link associated with the second device to be placed in an active state results in second payload data associated with the communication service to be transferred to the second device via the second link.

5. The first device of claim 1, wherein the operations further comprise: obtaining an identification of a first load accommodated by the first radio and an identification of a second load accommodated by the second radio, wherein the determining that the handover of the communication service from the first radio to the second radio is suggested is further based on the identification of the first load accommodated by the first radio and the identification of the second load accommodated by the second radio.

6. The first device of claim 1, wherein the operations further comprise: obtaining an identification of an application executed by the user equipment as part of the communication service, wherein the determining that the handover of the communication service from the first radio to the second radio is suggested is further based on the identification of the application.

7. The first device of claim 1, wherein the operations further comprise: obtaining an identification of a capability of the user equipment, wherein the determining that the handover of the communication service from the first radio to the second radio is suggested is further based on the identification of the capability.

8. The first device of claim 1, wherein the operations further comprise: obtaining an identification of a quality of service that is owed to the user equipment as part of the communication service, wherein the determining that the handover of the communication service from the first radio to the second radio is suggested is further based on the identification of the quality of service that is owed to the user equipment as part of the communication service.

9. The first device of claim 1, wherein the first data pertains to a first reference signal received power (RSRP), a first reference signal received quality (RSRQ), or a combination thereof, and wherein the second data pertains to a second RSRP, a second RSRQ, or a combination thereof.

10. The first device of claim 1, wherein the operations further comprise: based on the determining, causing a third link coupled to the user equipment and the first radio to be placed in an inactive state.

11. The first device of claim 1, wherein the operations further comprise: based on the receiving of the acknowledgment, instructing the user equipment to transmit second payload data associated with the communication service via a third link that is coupled to the user equipment and the second radio.

12. The first device of claim 11, wherein the operations further comprise: based on the determining, instructing the user equipment to buffer the second payload data while the handover of the communication service is negotiated with the second device.

13. The first device of claim 11, wherein the user equipment transmits the second payload data via a fourth link that is coupled to the user equipment and the first radio while the handover of the communication service is negotiated with the second device, and wherein the instructing of the user equipment to transmit the second payload data via the third link is based on a determination that the second payload data that was transmitted by the user equipment via the fourth link was lost.

14. A first device, comprising:
a processing system including a processor; and a memory that stores executable instructions that, when executed by the processing system, facilitate performance of operations, the operations comprising:

obtaining a report from a user equipment that obtains access to a communication service, wherein the report includes first data corresponding to a measurement of at least a first signal associated with a first radio and second data corresponding to a measurement of at least a second signa associated with a second radio, and wherein the first signal is different from the second signal and the first radio is different from the second radio, wherein the first data pertains to a first reference signal received power (RSRP), and wherein the second data pertains to a second RSRP;

based on obtaining the report, analyzing the first data and the second data;

based on the analyzing, determining that a handover of the communication service from the first radio to the second radio is suggested;

based on the determining, causing a first link associated with the first device to be placed in an inactive state;

based on the determining, negotiating the handover of the communication service with a second device, wherein the causing of the first link associated with the first device to be placed in the inactive state causes the user equipment to store in a buffer a first payload data associated with the communication service at the user equipment while the handover of the communication service is negotiated with the second device;

based on the determining, causing the user equipment to set a timer to an initial value, and initiate a counting of the timer such that when the timer reaches another value that is different from the initial value the user equipment is free to purge the first payload data from the buffer;

based on the negotiating, receiving an acknowledgment from the second device that indicates an acceptance by the second device of the handover of the communication service;

based on the receiving of the acknowledgment, causing a second link associated with the second device to be placed in an active state such that the first payload data associated with the communication service is transferred to the second device via the second link; and based on the determining, causing a third link coupled to the user equipment and the first radio to be placed in an inactive state.

15. The first device of claim 14, wherein the operations further comprise: based on the receiving of the acknowledgment, instructing the user equipment to transmit second payload data associated with the communication service via a third link that is coupled to the user equipment and the second radio.

16. The first device of claim 14, wherein the operations further comprise identifying a buffering capability of the user equipment, and wherein the causing of the user equipment to store in the buffer the first payload data is based on the buffering capability of the user equipment.

17. A first device, comprising:
a processing system including a processor; and
a memory that stores executable instructions that, when executed by the processing system, facilitate performance of operations, the operations comprising:

obtaining a report from a user equipment that obtains access to a communication service, wherein the report includes first data corresponding to a measurement of at least a first signal associated with a first radio and second data corresponding to a measurement of at least a second signal associated with a second radio, and wherein the first signal is different from the second signal and the first radio is different from the second radio, wherein the first data pertains to a first reference signal received quality (RSRQ), and wherein the second data pertains to a second RSRQ;

based on obtaining the report, analyzing the first data and the second data;

based on the analyzing, determining that a handover of the communication service from the first radio to the second radio is suggested;

based on the determining, causing a first link associated with the first device to be placed in an inactive state, wherein the causing of the first link associated with the first device to be placed in the inactive state causes the user equipment to store in a buffer a first payload data associated with the communication service at the user equipment;

based on the determining, causing the user equipment to set a timer to an initial value, and initiate a counting of the timer such that when the timer reaches another value that is different from the initial value the user equipment is free to purge the first payload data from the buffer;

based on the determining, negotiating the handover of the communication service with a second device;

based on the negotiating, receiving an acknowledgment from the second device that indicates an acceptance by the second device of the handover of the communication service;

based on the receiving of the acknowledgment, causing a second link associated with the second device to be placed in an active state such that first payload data associated with the communication service is transferred to the second device via the second link; and based on the determining, causing a third link coupled to the user equipment and the first radio to be placed in an inactive state.

18. The first device of claim 17, wherein the operations further comprise: based on the receiving of the acknowledgment, instructing the user equipment to transmit second payload data associated with the communication service via a third link that is coupled to the user equipment and the second radio.

19. The first device of claim 17, wherein the operations further comprise identifying a buffering capability of the user equipment, and wherein the causing of the user equipment to store in the buffer the first payload data is based on the buffering capability of the user equipment.

20. The first device of claim 17, wherein the causing of the user equipment to store in the buffer the first payload data comprises instructing the user equipment to buffer the first payload data while the handover of the communication service is negotiated with the second device.

* * * * *